(12) United States Patent
Kojima

(10) Patent No.: US 12,315,208 B2
(45) Date of Patent: May 27, 2025

(54) PERIPHERY DETECTION DEVICE FOR WORK MACHINE

(71) Applicant: KOBELCO CONSTRUCTION MACHINERY CO., LTD., Hiroshima (JP)

(72) Inventor: Yuki Kojima, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 469 days.

(21) Appl. No.: 17/906,559

(22) PCT Filed: Mar. 24, 2021

(86) PCT No.: PCT/JP2021/012188
§ 371 (c)(1),
(2) Date: Sep. 16, 2022

(87) PCT Pub. No.: WO2021/200448
PCT Pub. Date: Oct. 7, 2021

(65) Prior Publication Data
US 2023/0139466 A1    May 4, 2023

(30) Foreign Application Priority Data

Mar. 31, 2020   (JP) .................. 2020-063878

(51) Int. Cl.
G06V 10/22 (2022.01)
G06V 10/26 (2022.01)
G06V 20/52 (2022.01)

(52) U.S. Cl.
CPC .......... *G06V 10/225* (2022.01); *G06V 10/267* (2022.01); *G06V 20/52* (2022.01)

(58) Field of Classification Search
None
See application file for complete search history.

(56) References Cited

U.S. PATENT DOCUMENTS

2010/0124356 A1    5/2010 Hampapur et al.
2012/0020519 A1    1/2012 Yashiro
(Continued)

FOREIGN PATENT DOCUMENTS

EP    2 712 969 A1    4/2014
EP    3 385 457 A1    10/2018
(Continued)

OTHER PUBLICATIONS

Combined Chinese Office Action and Search Report issued Jan. 27, 2024 in Chinese Patent Application No. 202180023903.X (with unedited computer generated English translation), citing documents 1-3 therein, 12 pages.

(Continued)

*Primary Examiner* — Guillermo M Rivera-Martinez
(74) *Attorney, Agent, or Firm* — Oblon, McClelland, Maier & Neustadt, L.L.P.

(57) ABSTRACT

An image capturing device is provided on a working machine and takes a captured image of surroundings including an object around the working machine. A first setting part sets a detection region in the captured image where the object is detected. A responsive action part executes a predetermined responsive action in a case that the object is in the detection region in the captured image. The first setting part sets a boundary that is a limit of the detection region in the captured image. The boundary extends in a front orthogonal direction and has a certain shape.

11 Claims, 5 Drawing Sheets

(56) References Cited

U.S. PATENT DOCUMENTS

| | | | |
|---|---|---|---|
| 2013/0088593 A1* | 4/2013 | Ishimoto | E02F 9/226 |
| | | | 348/143 |
| 2014/0056518 A1 | 2/2014 | Yano et al. | |
| 2014/0088824 A1* | 3/2014 | Ishimoto | E02F 9/0841 |
| | | | 348/148 |
| 2014/0354813 A1* | 12/2014 | Ishimoto | G06T 11/60 |
| | | | 348/148 |
| 2015/0175071 A1* | 6/2015 | Ishimoto | E02F 9/262 |
| | | | 348/148 |
| 2015/0343976 A1* | 12/2015 | Lim | E02F 9/261 |
| | | | 340/435 |
| 2016/0005286 A1* | 1/2016 | Kiyota | E02F 9/262 |
| | | | 340/435 |
| 2016/0200252 A1* | 7/2016 | Oota | B60T 8/17 |
| | | | 348/148 |
| 2018/0258616 A1* | 9/2018 | Kiyota | G06T 1/00 |
| 2019/0024348 A1* | 1/2019 | Hiekata | E02F 9/267 |
| 2019/0218754 A1* | 7/2019 | Izumikawa | G06V 20/58 |
| 2019/0241124 A1 | 8/2019 | Izumikawa et al. | |
| 2019/0360177 A1* | 11/2019 | Kiyota | B60R 1/23 |
| 2020/0005066 A1 | 1/2020 | Iwamoto | |
| 2020/0250831 A1* | 8/2020 | Ishikawa | B66C 15/065 |
| 2021/0002863 A1* | 1/2021 | Sakuta | H04N 7/18 |
| 2021/0303834 A1* | 9/2021 | Ozaki | G06V 40/103 |

FOREIGN PATENT DOCUMENTS

| | | |
|---|---|---|
| EP | 3 595 298 A1 | 1/2020 |
| JP | 2012-168845 A | 9/2012 |
| JP | 2017-102604 A | 6/2017 |
| JP | 2019-157497 A | 9/2019 |
| JP | 2020-00511 A | 1/2020 |
| JP | 2020-013220 A | 1/2020 |

OTHER PUBLICATIONS

International Search Report mailed on May 18, 2021 in PCT/JP2021/012188 filed on Mar. 24, 2021 (citing references 2-3 & 15-18 therein, 2 pages).

Extended European Search Report issued on Jun. 15, 2023 in European Patent Application No. 21781981.2, citing documents 1 and 15-17 therein, 8 pages.

* cited by examiner

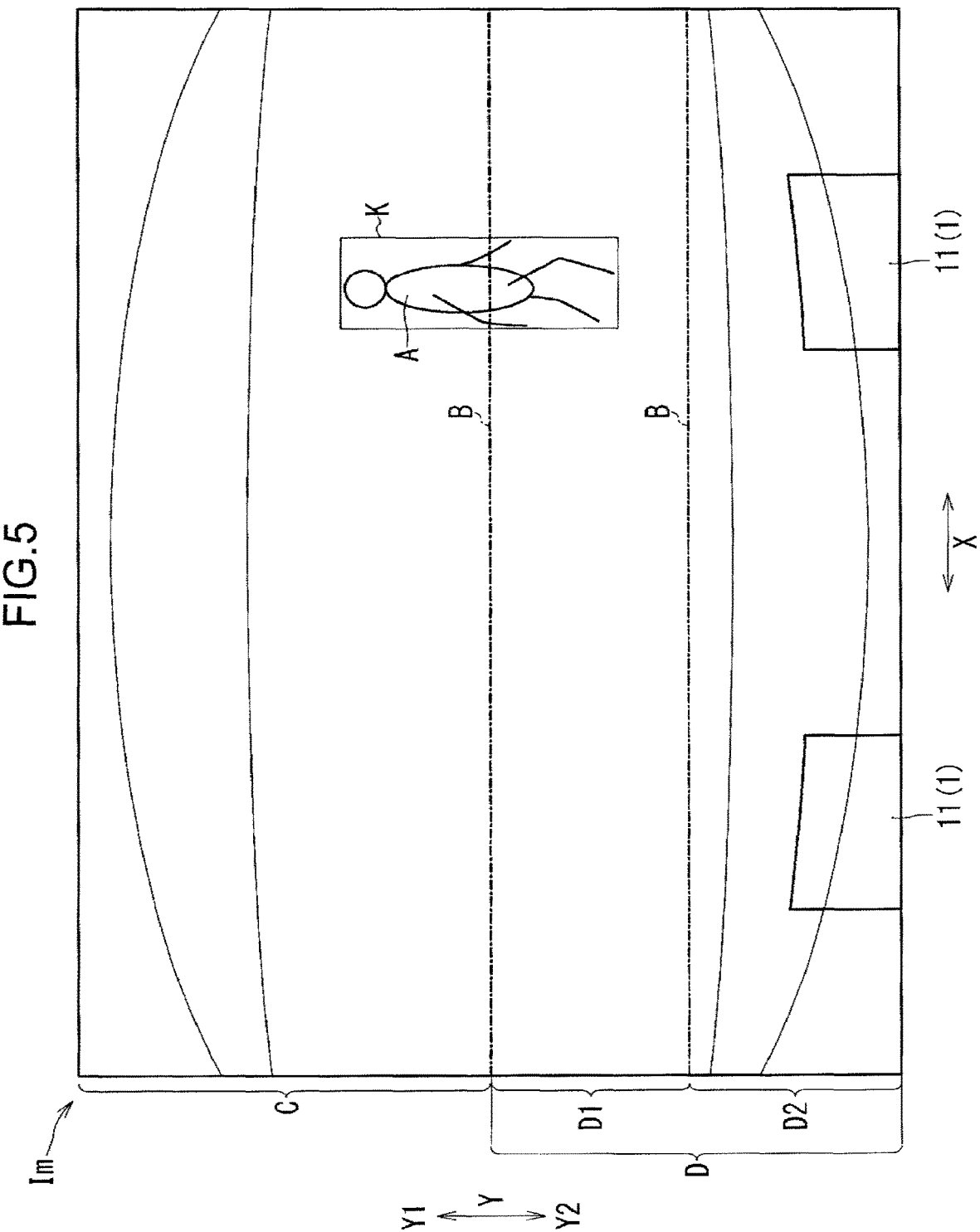

PERIPHERY DETECTION DEVICE FOR WORK MACHINE

TECHNICAL FIELD

The present invention relates to a surroundings observation device for use in a working machine which detects an object around the working machine.

BACKGROUND ART

For example, Patent Literature 1 discloses a conventional surroundings observation device. In the technology disclosed in Patent Literature 1, an image capturing device captures an image of an object. Thereafter, the coordinate of the object taken in the captured image is converted into a coordinate on a virtual plane (see FIG. 5 of Patent Literature 1).

A process of converting the coordinate of the object taken in the captured image into a coordinate on a virtual plane is complicated, leading to a problem of involving a high processing load and a low processing speed. Additionally, there is a case that a responsive action such as a warning or an operational restriction is executed when the object is in a detection region around the working machine. In this case, the conversion of the coordinate of the object taken in the captured image into a coordinate on a virtual plane may delay the starting of the responsive action.

CITATION LIST

Patent Literature

Patent Literature 1: Japanese Unexamined Patent Publication No. 2017-102604

SUMMARY OF INVENTION

The object of the present invention is to provide a surroundings observation device for use in a working machine which can reduce the processing load required for detection of an object and shorten the processing time.

A surroundings observation device for use in a working machine according to an aspect of the present invention includes: at least one image capturing device provided on the working machine to capture an image of an object around the working machine and thereby obtain an captured image; a specifying part for specifying a position of the object in the captured image; a first setting part for setting in the captured image a detection region where the object is to be detected; a responsive action part for executing a predetermined responsive action in a case that the object is in the detection region in the captured image. The first setting part sets a boundary that is a limit of the detection region in the captured image. The boundary extends in a front orthogonal direction and has a certain shape. The front orthogonal direction being orthogonal to a forward direction of the working machine in the captured image.

BRIEF DESCRIPTION OF DRAWINGS

FIG. 5 is similar to FIG. 4, and illustrates a case that a plurality of boundaries shown in FIG. 4 is set.

DESCRIPTION OF EMBODIMENTS

With reference to FIGS. 1 to 5, a surroundings observation device 20 (see FIG. 2) for use in a working machine 1 (see FIG. 1) will be described.

Figure 1:
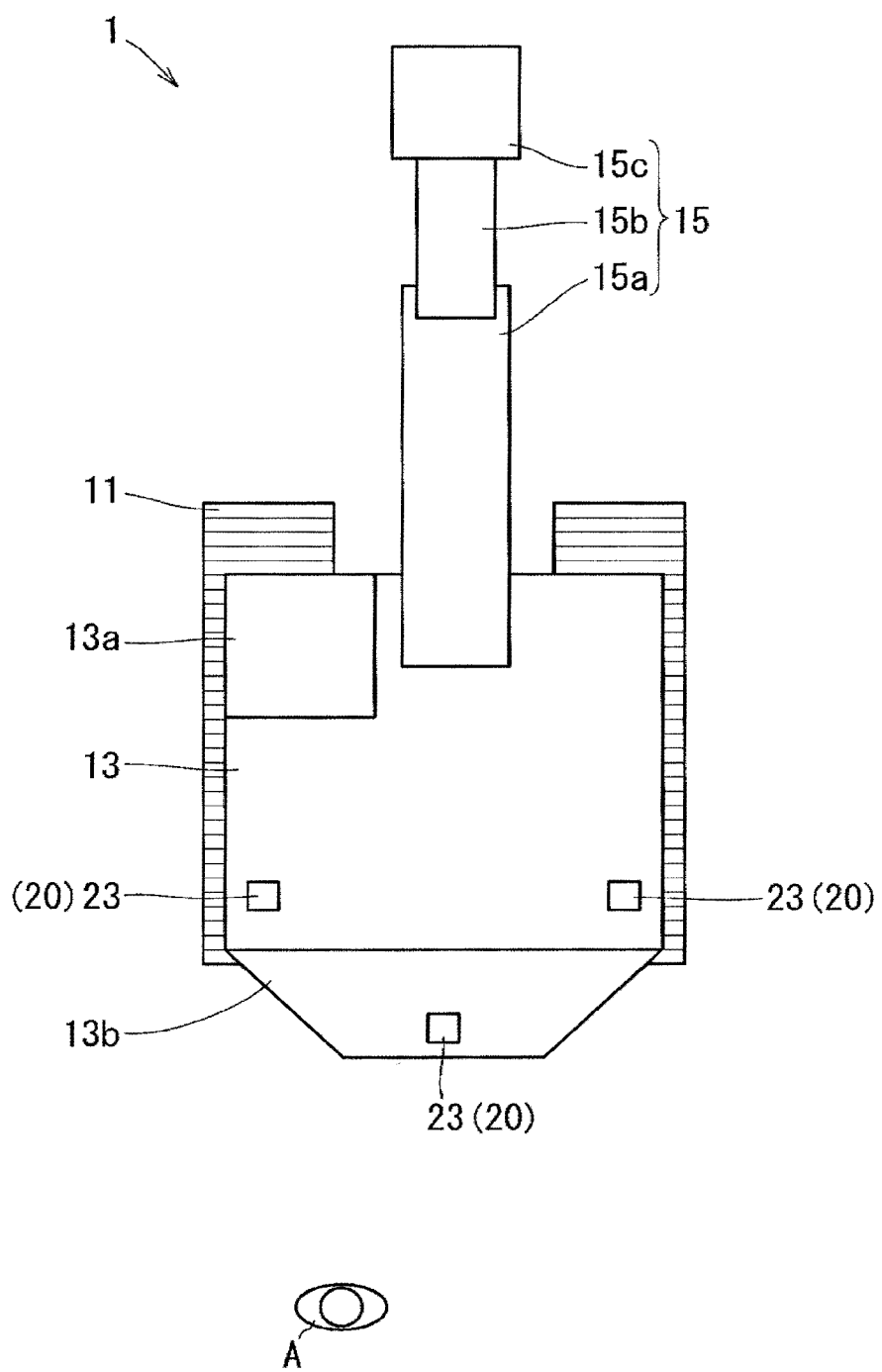
FIG. 1 is a plan view of a working machine.

As shown in FIG. 1, the working machine 1 is a machine for performing a work, e.g., a construction machine for performing a construction work. The construction machine is, for example, an excavator (e.g., hydraulic excavator) or a crane. The following description will be made about the case where the working machine 1 serves as an excavator. The working machine 1 includes a lower traveling body 11, an upper slewing body 13, and an attachment 15.

The lower traveling body 11 causes the working machine 1 to travel. The lower traveling body 11 includes, for example, a crawler, or may include a blade.

The upper slewing body 13 is slewably mounted on the lower traveling body 11. The upper slewing body 13 includes a cab 13a and a counterweight 13b. The cab 13a is a section allowing an operator to operate the working machine 1 aboard. The counterweight 13b is a weight for balancing the working machine 1 in the longitudinal direction thereof.

The attachment 15 is a portion for performing a work and includes, for example, a boom 15a, an arm 15b, and a leading end attachment 15c. The boom 15a is raisably and lowerably attached to the upper slewing body 13. The arm 15b is rotatably attached to the boom 15a. The leading end attachment 15c is provided on a leading end portion of the attachment 15, and is rotatably attached to the arm 15b. The leading end attachment 15c may be a bucket for shoveling up earth and sand, a device (such as a grapple) for nipping an article, or a device (such as a breaker) for crush and excavation.

Figure 2:
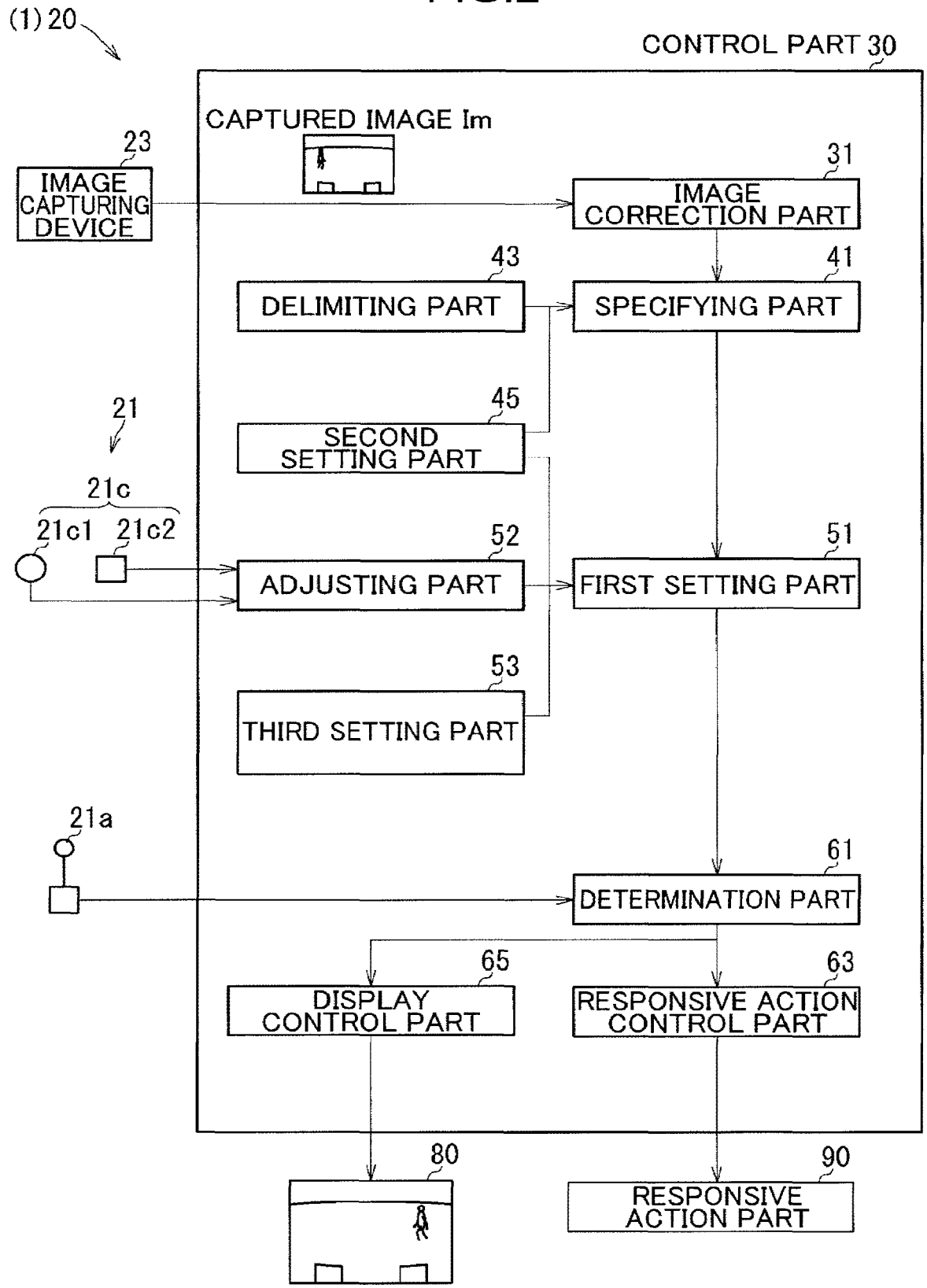
FIG. 2 is a diagram of a surroundings observation device for use in the working machine shown in FIG. 1.

The surroundings observation device 20 detects an article (object A) around the working machine 1. The surroundings observation device 20 detects the object A on the basis of a captured image Im (see FIG. 4). The object A is a person (worker) around the working machine 1, or may be an obstacle other than the person around the working machine 1. As shown in FIG. 2, the surroundings observation device 20 includes an operating part 21, an image capturing device 23, a control part 30, a captured image display part 80, and a responsive action part 90.

The operating part 21 is a section for allowing the operator to operate the working machine 1 (see FIG. 1). The operating part 21 is disposed in the cab 13a (see FIG. 1). In the case that the working machine 1 is remotely controlled, the operating part 21 may be disposed at a position away from the working machine 1 (see FIG. 1). The operating part 21 includes a travel operating part 21a and an input device 21c for adjusting a boundary. The travel operating part 21a is a section for causing the lower traveling body 11 (see FIG. 1) to travel (specifically, forward and backward). The travel operating part 21a is a lever (control lever). The input device 21c is adapted for adjusting a position of a boundary B (see FIG. 4), which will be described later. The input device 21c includes, for example, a jog dial 21c1 and a switch 21c2 (e.g., a push switch). The jog dial 21c1 and the switch 21c2 are integrated, or may be separated.

The image capturing device 23 takes a captured image Im (see FIG. 4) of surroundings including the object A as shown in FIG. 1. The image capturing device 23 monitors the surroundings of the working machine 1. The image capturing device 23 is fixedly attached to the upper slewing body 13. The imaging range of the image capturing device 23 preferably covers the blind spots from the operator in the cab 13a. The number of the image capturing device 23 is one, or may be more. The image capturing device 23 is disposed, for example, on a rear portion (e.g., on the counterweight 13b or in the vicinity thereof), a right portion, and a left portion of the upper slewing body 13. In a case that the working machine 1 is remotely controlled, the image capturing device 23 may be disposed on a front portion (e.g., in the cab 13a) of the upper slewing body 13. The image capturing device 23 can capture over a wide range, for example, with a fisheye lens.

The captured image Im (see FIG. 4) taken by the image capturing device 23 is a two-dimensional picture (specifically, video frame), or may be a three-dimensional image (e.g., a captured image taken by a stereo camera). In the captured image Im shown in FIG. 4, a side closer to the working machine 1 is defined as an image lower side Y2 (to-machine side) and a side farther away from the working machine 1 is defined as an image upper side Y1 (fro-machine side). In the captured image Im, a direction in which the object A approaches or moves away from the working machine 1 by the shortest distance is defined as a forward direction (in FIG. 4, corresponding to the image vertical direction Y). In the captured image Im, a direction orthogonal to the forward direction is defined as a front orthogonal direction (in FIG. 4, corresponding to an image left-right direction X). Since the terms "upper", "lower", "left", "right" are merely used for convenience of explanation, the image capturing device 23 may be turned or inversed.

The control part 30 (see FIG. 2) performs inputting and outputting of information, computations (determination and settings), and storing of information. The control part 30 shown in FIG. 2 is disposed on the upper slewing body 13 (see FIG. 1), or may be disposed outside the upper slewing body 13 (e.g., in a server). For example, some constituents of the control part 30 are disposed on the upper slewing body 13 and the other constituents thereof are disposed outside the upper slewing body 13. The control part 30 includes an image correction part 31, a specifying part 41, a delimiting part 43, a first setting part 51, a second setting part 45, a third setting part 53, an adjusting part 52, a determination part 61, a responsive action control part 63, and a display control part 65.

The image correction part 31 corrects the captured image Im taken by the image capturing device 23. The image correction part 31 corrects distortion (image distortion) in the captured image Im. Any method is applicable to the correction of the distortion by the image correction part 31. For example, the image correction part 31 may reduce the distortion by expanding or contracting the captured image Im. For example, in the captured image Im, the image correction part 31 may remove a part where there is more distortion while maintaining a part where there is less distortion. A captured image Im resulting from the correction by the image correction part 31 is also referred to as "captured image Im".

Figure 4:
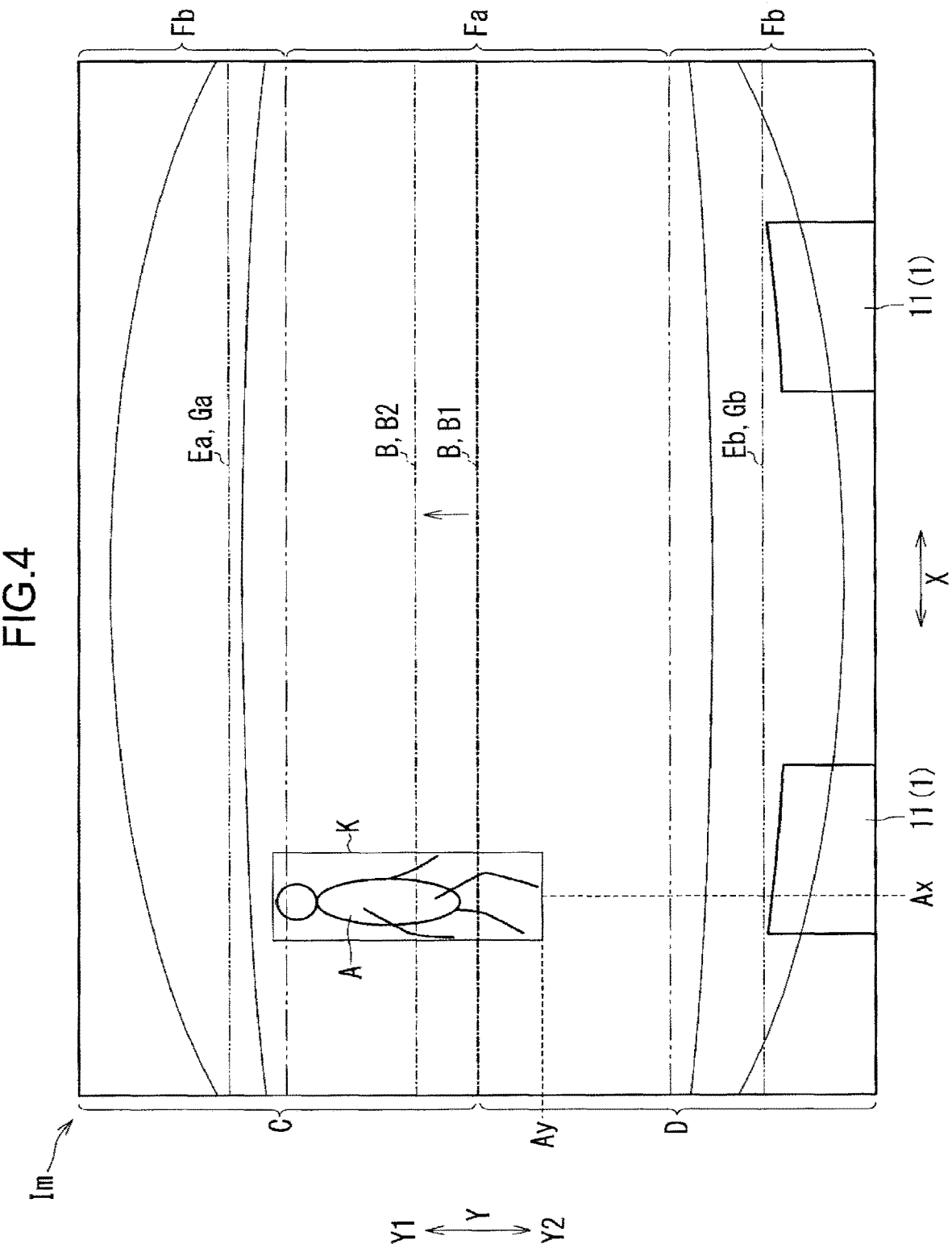
FIG. 4 illustrates a captured image taken by an image capturing device shown in FIG. 2.

The specifying part 41 specifies a position of the object A in the captured image Im shown in FIG. 4. Specifically, the specifying part 41 (see FIG. 2) automatically determines (recognizes, discriminates) by executing image processing whether or not an object in the captured image Im agrees with the object A. The specifying part 41 performs the determination on the basis of the features (e.g., shape, color) of the object in the captured image Im. Further, the specifying part 41 calculates a closest position (coordinate Ax, Ay) of the object A to the working machine 1 in the captured image Im. For example, the specifying part 41 calculates the coordinate of a part of the object A in the image lower side Y2 (e.g., a part under the feet of the worker). The specifying part 41 is not required to determine the precisely closest one (the closest point) to the working machine 1 as the coordinate (Ax, Ay) of the object A. The specifying part 41 may determine a position in the vicinity of the closest point of the object A to the working machine 1 as the coordinate (Ax, Ay) of the object A. The specifying part 41 preferably determines the closest point of the object A to the working machine 1 as the coordinate (Ax, Ay) of the object A.

The delimiting part 43 (sec FIG. 2) can set a specific upper limit position Ea (first limit position) and a specific lower limit position Eb (second limit position) in the captured image Im. The specific upper limit position Ea is preset by the delimiting part 43, or may be set manually or automatically (the same is applied to the specific lower limit position Eb). In the case that both of the specific upper limit position Ea and the specific lower limit position Eb are set, the specific lower limit position Eb is set to be closer to the image lower side Y2 than the specific upper limit position Ea.

Case 1: In the case that the delimiting part 43 sets the specific upper limit position Ea, a specifying area in which the specifying part 41 (see FIG. 2) specifics the object A is within a region closer to the image lower side Y2 than the specific upper limit position Ea. The "within a region" above need not cover the whole of the region, and may be at least a part of the region (hereinafter, the same). The specifying part 41 does not specify the object A in a region closer to the image upper side Y1 than the specific upper limit position Ea. Case 2: In the case that the delimiting part 43 sets the specific lower limit position Eb, the specifying area in which the specifying part 41 (see FIG. 2) specifies the object A is within a region closer to the image upper side Y1 than the specific lower limit position Eb. The specifying part 41 does not specify the object A in a region closer to the image lower side Y2 than the specific lower limit position Eb. Case 3: In the case that the delimiting part 43 sets both of the specific upper limit position Ea and the specific lower limit position Eb, the specifying area in which the specifying part 41 (see FIG. 2) specifies the object A is within a region between the specific upper limit position Ea and the specific lower limit position Eb. The specifying part 41 does not specify the object A in a region closer to the image upper side Y1 than the specific upper limit position Ea. In Cases 1, 2, and 3 above, the specifying part 41 does not specify the object A in a part of the captured image Im. Thus, the specifying area of the specifying part 41 is limited in comparison with the case that the specifying part 41 specifies it in the whole of the captured image Im, thereby reducing the processing load and shortening the processing time. The specific upper limit position Ea and the specific lower limit position Eb are set on the basis of, for example, the necessity of specifying the object A.

The specific upper limit position Ea is set as follows. There is a case that a part of the image upper side Y1 in the captured image Im has the sky. Specifying the object A in a part having the sky is likely to cause excessive detection or misdetection. Therefore, the specific upper limit position Ea is set on the basis of a part which is presumed to have the sky. For example, the specific upper limit position Ea is set such that a part which is presumed to have the sky is closer to the image upper side Y1 than the specific upper limit position Ea.

The specific lower limit position Eb is set as follows. There is a case that a part of the image lower side Y2 in the captured image Im has a part of the upper slewing body 13 (see FIG. 1). In this case, the part that has the upper slewing body 13 does not bear the object A. Therefore, the delimiting part 43 sets the specific lower limit position Eb on the basis of a part which is presumed to have the upper slewing body 13. For example, the delimiting part 43 sets the specific lower limit position Eb such that a part which is presumed to have the upper slewing body 13 is closer to the image lower side Y2 than the specific lower limit position Eb.

The second setting part 45 (see FIG. 2) sets, in the captured image Im, a high distortion region Fb (first distortion region) and a low distortion region Fa (second distortion region). The high distortion region Fb is preset by the second setting part 45, or may be manually or automatically set (the same is applied to the low distortion region Fa). The low distortion region Fa has less image distortion than the high distortion region Fb.

The second setting part 45 sets the high distortion region Fb and the low distortion region Fa as follows. There is a case that a part of the image upper side Y1 and a part of the image lower side Y2 are more distorted than a middle part in the image vertical direction Y. Therefore, the part of the image upper side Y1 and the part of the image lower side Y2 in the captured image Im are set as high distortion regions Fb, and the part other than the high distortion regions Fb in the captured image Im is set as a low distortion region Fa. As described above, the part of the image upper side Y1 in the captured image Im is presumed to have the sky; thus, omission of specifying the object A therein will not cause the problem. In other words, the specifying area in which the specifying part 41 (see FIG. 2) specifies the object A is within the low distortion region Fa and the high distortion region Fb in the part of the image lower side Y2 (i.e., third distortion region). The specifying part 41 does not specify the object A in the high distortion region Fb in the part of the image upper side Y1 (i.e., fourth distortion region). Thus, in comparison with the case that the specifying part 41 specifies it in the whole of the captured image Im, the specifying area of the specifying part 41 is limited, thereby reducing the processing load and shortening the processing time. On the other hand, the specifying part 41 specifies the object A in the high distortion region Fb in the part of the image lower side Y2, enabling an appropriate detection of the object A approaching the working machine 1.

There may be a case that all of the specific upper limit position Ea, the specific lower limit position Eb, the high distortion region Fb, and the low distortion region Fa are set. In this case, the specifying part 41 (see FIG. 2) specifies the object A in a region that is between the specific upper limit position Ea and the specific lower limit position Eb and is in the low distortion region Fa, but not in the other region. The case described above, where a part of the image upper side Y1 and a part of the image lower side Y2 in the captured image Im are set as high distortion regions Fb and a middle part in the image vertical direction Y is set as a low distortion region Fa, is merely an example. Which part of the captured image Im becomes the high distortion region Fb and the low distortion region Fa depends on a view angle and a disposition of the image capturing device 23, and a correction by the image correction part 31.

The first setting part 51 (see FIG. 2) sets a detection region D. The detection region D is a region in the captured image Im where the object A is to be detected, on the basis of which the responsive action part 90 (see FIG. 2) determines whether or not to execute a predetermined responsive action. In the captured image Im, the region other than the detection region D is defined as a non-detection region C.

The first setting part 51 sets a boundary B that is a limit of the detection region D in the captured image Im. It may be appreciated to set one boundary B, or alternatively a plurality of boundaries B. The boundaries B include at least a limit between the detection region D and the non-detection region C. In the case of a plurality of boundaries B, the boundary B farthest away from the working machine 1 (in the image upper side Y1) is the limit (an extremity of the detection region D) between the detection region D and the non-detection region C. The boundaries B may include a line which separates a plurality of detection regions D from one another. Specifically, the boundaries B may include a line (standard line) which separates a detection region D1 from a detection region D2 as shown in FIG. 5. As shown in FIG. 4, the boundary B is preferably set such that the processing load on the control part 30 (see FIG. 2) is minimized. Specifically, the boundary B is a line that extends in the image left-right direction X and has a certain (unchangeable) shape. Preferably, the boundary B is substantially linear, more preferably, linear in the captured image Im. The "substantially linear" above covers a curved line along apart (e.g., a rear end of the counterweight 13b (see FIG. 1)) of the upper slewing body 13 (see FIG. 1) in the captured image Im.

Preferably, the boundary B is set in a captured image Im resulting from the correction by the image correction part 31 (see FIG. 2) for the following reason. In a part of the captured image Im where there is more distortion, the actual distance from the working machine 1 to the object A considerably varies due to a position of the object A in the image left-right direction X even if the position of the object A in the image vertical direction Y is fixed. Thus, in the case that a boundary B which is linear or substantially linear is set in a part of the captured image Im where there is more distortion, whether or not the object A is in the detection region D changes according to the position of the object A in the image left-right direction X even if the actual distance from the working machine 1 to the object A is uniform. Thus, the actual distance (responsive action start distance) between the object A and the working machine 1 when the responsive action part 90 (see FIG. 2) starts to execute a responsive action varies according to the position of the object A in the image left-right direction X in the captured image Im, which makes it difficult for the operator of the working machine 1 to understand by what distance the approach of the object A to the working machine 1 causes the responsive action to be started (the operator has difficulty in grasping the sense of distance). On the other hand, in this embodiment, a boundary B that is substantially linear or linear is set in the captured image Im resulting from the correction of distortion by the image correction part 31 (see FIG. 2). Thus, the responsive action start distance is uniform or substantially uniform regardless of the position of the object A in the image left-right direction X. Therefore, the operator easily grasps the sense of distance. Additionally, since the responsive action start distance is uniform or substantially uniform, the responsive action is properly executed.

The first setting part 51 (see FIG. 2) sets the boundary B in the low distortion region Fa for the same reason as described above. Thus, the responsive action start distance is substantially uniform regardless of the position of the object A in the image left-right direction X, allowing the operator to easily grasp the sense of distance. Further, as described above, there may be a case that a part of the image upper side Y1 in the captured image Im has the sky and a part of the image lower side Y2 in the captured image Im has the lower traveling body 11. Therefore, setting the boundary B in the low distortion region Fa, which is a middle part of the captured image Im in the image vertical direction Y, enables an appropriate detection of the object A. Further, since the boundary B is set in the low distortion region Fa, the object A can be detected earlier in comparison with a case that the boundary B is set in the high distortion region Fb closer to the working machine 1 (in the image lower side Y2).

Second Setting Part 45

The second setting part 45 sets the low distortion region Fa (second distortion region) where the boundary B may be set, and the high distortion region Fb (first distortion region) where the boundary B may not be set. The second setting part 45 sets the low distortion region Fa (second distortion region) and the high distortion region Fb (third distortion region) in the image lower side Y2, where the specifying part 41 may perform the specification. The second setting part 45 sets the high distortion region Fb (fourth distortion region) in the image upper side Y1, where the specifying part 41 does not perform the specification. A low distortion region Fa (first low distortion region), where the boundary B is set, may be identical to or different from a low distortion region Fa (second low distortion region), where the specifying part 41 specifies the object A. The range suitable for the first low distortion region does not always coincide with the range suitable for the second low distortion region. Thus, the first low distortion region and the second low distortion region are preferably positioned differently. Only one of the first low distortion region and the second low distortion region may be set.

The first setting part 51 (see FIG. 2) may set a plurality of boundaries B as shown in FIG. 5. The first setting part 51 may set a plurality of detection regions D1 and D2. In this case, the first setting part 51 sets the plurality of boundaries B apart from each other in the image vertical direction Y. As described later, the responsive action part 90 changes the responsive action according to the boundary B that is crossed by the object A.

In the case that a plurality of image capturing devices 23 (see FIG. 1) is provided, the first setting part 51 (see FIG. 2) sets a boundary B (for each image capturing device 23) in each of a plurality of captured images Im taken by the plurality of image capturing devices 23. The first setting part 51 sets the boundary B such that the responsive action start distance for each image capturing device 23 is uniform or substantially uniform. The first setting part 51 includes an adjusting part 52 (see FIG. 2).

The adjusting part 52 (see FIG. 2) adjusts the position of the boundary B shown in FIG. 4 in the image vertical direction Y. The shape of the boundary B in the captured image Im is fixed regardless of the adjustment of the position of the boundary B by the adjusting part 52. A change of the position of the boundary B in a part of the captured image Im where there is more distortion requires a change of the curvature of the boundary B in accordance with the distortion of the captured image Im, involving preparation of parameters. However, in this embodiment, the shape of the boundary B is fixed. The adjustment of the position of the boundary B by the adjusting part 52 is manual, or may be automatic.

For example, the position of the boundary B is manually adjusted as follows. The control part 30 (see FIG. 2) is set in "adjustment mode". The captured image display part 80 (see FIG. 2), which will be described later, then superimposes and displays the boundary B on the captured image Im, at which the operator looks, and performs an operation of determining the position of the boundary B by shifting the boundary B in the image vertical direction Y. The operation is performed with the input device 21c (see FIG. 2). Specifically, the operator determines the position of the boundary B by turning the jog dial 21c1 (see FIG. 2) to shift the boundary B in the image vertical direction Y and using (pushing) the switch 21c2 (see FIG. 2).

For example, the position of the boundary B is automatically adjusted as follows. The position of the boundary B is adjusted on the basis of, for example, the travel speed of the working machine 1. Specifically, the adjusting part 52 (see FIG. 2) determines the position of the boundary B in the captured image Im when the travel speed of the working machine 1 to the object A is a first speed as a first position B1. A travel speed of the working machine 1 to the object A higher than the first speed is defined as a second speed. The position of the boundary B in the captured image Im at the second speed is determined as a second position B2. The adjusting part 52 sets the second position B2 to be closer to the image upper side Y1 than the first position B1. The adjusting part 52 may set the position of the boundary B in a portion closer to the image upper side Y1 step-by-step or consecutively as the travel speed of the working machine 1 becomes higher. Whether or not the working machine 1 travels toward the object A can be determined on the basis of the direction of the travel (forward, backward) of the lower traveling body 11, the slewing angle of the upper slewing body 13 with respect to the lower traveling body 11, and the direction in which the image capturing device 23 captures the image. The position of the boundary B may not be adjusted (i.e., the adjusting part 52 may not be provided). There may be a case that the first setting part 51 presets a boundary B and the position of the boundary B is unchanged.

In the case that the adjusting part 52 adjusts the position of the boundary B, the adjusting part 52 acquires directly or indirectly the travel speed of the working machine 1. For example, the adjusting part 52 shown in FIG. 2 acquires the travel speed on the basis of the operation amount of the travel operating part 21a. The adjusting part 52 may acquire the travel speed on the basis of information (number of rotations, flow amount of hydraulic oil) on a motor for causing the lower traveling body 11 (see FIG. 1) to travel. The adjusting part 52 may acquire the travel speed with a sensor for detecting the position of the working machine 1.

The third setting part 53 sets a boundary upper limit position Ga (first utmost position) and a boundary lower limit position Gb (second utmost position) in the captured image Im as shown in FIG. 4. The boundary lower limit position Gb is set to be closer to the image lower side Y2 than the boundary upper limit position Ga. The boundary B is set within a region between the boundary upper limit position Ga and the boundary lower limit position Gb. As in the case of the specific upper limit position Ea and the specific lower limit position Eb, the boundary upper limit position Ga and the boundary lower limit position Gb are set on the basis of, for example, the necessity of specifying the object A. In the case that all of the boundary upper limit position Ga, the boundary lower limit position Gb, the high distortion region Fb, and the low distortion region Fa are set, the first setting part 51 sets the boundary B in a region that is between the boundary upper limit position Ga and the boundary lower limit position Gb and is in the low distortion region Fa. In FIG. 4, the boundary upper limit position Ga coincides with the specific upper limit position Ea; however, the boundary upper limit position Ga is not required to coincide with the specific upper limit position Ea (the same is applied to the boundary lower limit position Gb and the specific lower limit position Eb).

The determination part 61 (see FIG. 2) determines whether or not a part or the whole of the object A is within the detection region D. Specifically, the determination part 61 determines, for example, whether or not the coordinate (Ax, Ay) of an end portion of a frame K in the image lower side Y2 is within the detection region D. In the case that the boundary B is linear, a simple determination as to whether or not the coordinate (Ay) of the object A in the image vertical direction Y is closer to the working machine 1 (to the image lower side Y2) than the coordinate of the boundary B in the image vertical direction Y, serves as the determination as to whether or not the object A is within the detection region D.

The responsive action control part 63 (see FIG. 2) causes the responsive action part 90 (see FIG. 2) to execute a predetermined responsive action when an entry by the object A into the detection region D is detected (details will be described later). The responsive action control part 63 does not cause the responsive action part 90 to execute the predetermined responsive action in the case that the entry by the object A into the detection region D is not detected.

The display control part 65 (see FIG. 2) controls display contents of the captured image display part 80 (see FIG. 2).

The captured image display part 80 (see FIG. 2) displays the captured image Im. The captured image display part 80 is disposed, for example, in the cab 13a shown in FIG. 1. In a case that the working machine 1 is remotely controlled, the captured image display part 80 (see FIG. 2) may be disposed outside the working machine 1. The captured image display part 80 is a part or the whole of a display. The captured image display part 80 displays the captured image Im (see FIG. 4) taken by the image capturing device 23, with the captured image Im being horizontally inverted like an image reflected in a rearview mirror seen from the cab 13a. The captured image display part 80 may display the captured image Im shown in FIG. 4 with the boundary B being superimposed thereon. The captured image display part 80 may display the captured image Im with the detection region D being superimposed thereon. There may be a case that the boundary B is not displayed on the captured image display part 80 and only used for internal processing such as determination in the determination part 61 (see FIG. 2) (the same is applied to the detection region D). In the case that a plurality of image capturing devices 23 is provided, the captured image display part 80 switches and displays respective captured images Im of the image capturing devices 23, or alternatively may display a captured image Im obtained by merging captured images Im taken by the plurality of image capturing devices 23.

The responsive action part 90 (see FIG. 2) executes a predetermined responsive action in a case that the object A is in the detection region D. The responsive action executed by the responsive action part 90 shown in FIG. 2 is a warning, or may be a restriction to an operation of the working machine 1 or another action. In the case that the responsive action executed by the responsive action part 90 is a warning, the warning is given, for example, to the operator of the working machine 1 or to the worker around the working machine 1. The warning is by sound, or may be by light or by an image (including a text, a graphic) on a display, or a combination thereof. In the case that the responsive action executed by the responsive action part 90 is a restriction to an operation of the working machine 1, the restriction is, for example, slowing down or stopping the operation of the working machine 1. The operation of the working machine 1 restricted by the responsive action part 90 is traveling of the lower traveling body 11 shown in FIG. 1, or may be slewing of the upper slewing body 13 with respect to the lower traveling body 11, or an operation of the attachment 15. In the case that a plurality of boundaries B is set as shown in FIG. 5, the responsive action part 90 may change the responsive action according to the boundary B that is crossed by the object A. In this case, the responsive action part 90 may make higher the degree of a warning or a restriction as the object A crosses a closer boundary B to the working machine 1 (to the image lower side Y2). For example, the responsive action part 90 changes the pattern of the warning (e.g., the contents, the number of times, the duration of the warning) or the degree of the restriction to an operation of the working machine 1 according to the boundary B that is crossed by the object A.

Operation

Figure 3:
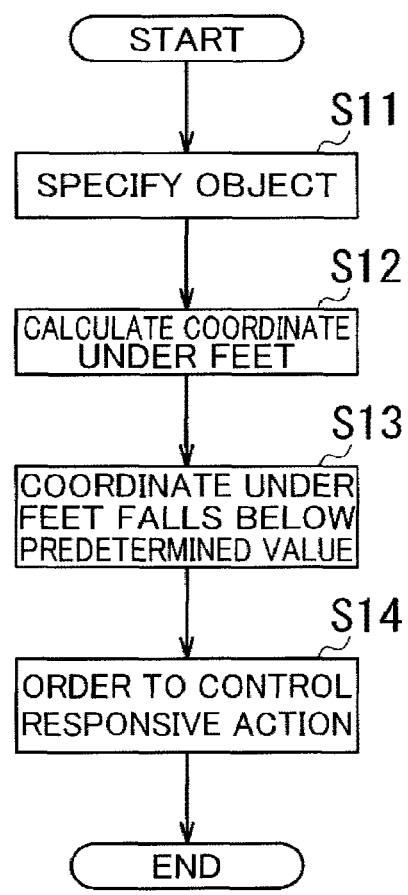
FIG. 3 is a flowchart showing a procedure of a control part shown in FIG. 2.

An operation of the control part 30 shown in FIG. 2 will be described with reference to FIG. 3. The specifying part 41 shown in FIG. 2 specifies the object A in the captured image Im (Step S11), and calculates the coordinate of the object A (e.g., the coordinate under the feet) (Step S12). When the coordinate of the object A in the image vertical direction Y falls below the coordinate (a predetermined value) of the boundary B in the image vertical direction Y (Step S13), the responsive action control part 63 outputs an order to the responsive action part 90 (Step S14).

Study of Processing Load and Processing Speed

A case in which a coordinate in the captured image Im shown in FIG. 4 is converted into a coordinate on a virtual plane will be discussed. In this case, the following processes are executed. Step 1: The position of the object A in the captured image Im is calculated. Step 2: A coordinate in the captured image Im is converted into a coordinate on a virtual plane based on the working machine 1 shown in FIG. 1 (A region on the virtual plane is created). Step 3: The coordinate of the object A on the virtual plane is calculated. Step 4: The distance from the working machine 1 to the object A on the virtual plane is calculated. Step 5: A responsive action (e.g., a warning, an operational restriction) is executed when the distance from the working machine 1 to the object A falls below a predetermined value.

As described above, in the case that a coordinate in the captured image Im shown in FIG. 4 is converted into a coordinate on the virtual plane, Steps 2, 3, and 4 above require complicated processes, resulting in a high processing load and a long processing time. For example, a calculation of a coordinate of the object A on the virtual plane requires information on an attachment position and an attachment angle of the image capturing device 23 (see FIG. 1), and the logic of the calculation is complicated. A long processing time prolongs the time between an entry by the object A into the detection region D (crossing of the object A over the boundary B) and the starting of the responsive action (or delaying the responsive action). Typically, the attachment position and the attachment angle of the image capturing device 23 vary according to the kind and the specifics of the working machine 1. Thus, it is required to set parameters according to the kind and the specifics of the working machine 1, which is laborious (complicated).

On the other hand, in this embodiment, a coordinate in the captured image Im is not converted into a coordinate on a virtual plane (see FIG. 3), enabling omission of the processes in Steps 2, 3, and 4 above. Thus, the processing load on the control part 30 (see FIG. 2) can be reduced; the processing speed can be increased; and the processing time can be shortened. Accordingly, the time between the entry by the object A into the detection region D and the starting of a responsive action (a warning, an operational restriction) can be shortened (i.e., the responsive action can be quickly executed). Further, since a coordinate in the captured image Im is not converted into a coordinate on the virtual plane, information on the attachment position and the attachment angle of the image capturing device 23 (see FIG. 1) is not required. Thus, even without a complicated setting of parameters, the surroundings observation device 20 (see FIG. 2) is applicable to various kinds of the working machines 1 (i.e., has high versatility).

Comparison with Distance Sensor

Typically, in comparison with a case that the object A is specified with a sensor (e.g., Time Of Flight (TOF) sensor, ultrasonic sensor, infrared sensor, or radio wave (such as millimeter waves) sensor) which acquires dimensional information, specifying the object A by executing image processing on the captured image Im requires a higher processing load and a longer processing time. On the other hand, in this embodiment, the object A is specified only in a part of the captured image Im as described above, thereby reducing the processing load and shortening the processing time. Further, in this embodiment, omission of the processes other than that of specifying the object A (e.g., processes in Steps 2, 3, and 4) results in reducing the processing load on the control part 30 and shortening the processing time. Additionally, in a case that the object A is a person, the surroundings observation device 20 can detect the person only as a detection target; however, a sensor which acquires dimensional information cannot detect the person only as the detection target.

Effects

The effects exerted by a surroundings observation device 20 for use in a working machine 1 shown in FIG. 2 are as follows.

The surroundings observation device 20 includes a image capturing device 23, a specifying part 41, a first setting part 51, and a responsive action part 90. The image capturing device 23 is provided on the working machine 1 and takes a captured image Im of surroundings including an object A (see FIG. 4) around the working machine 1. The specifying part 41 specifies a position of the object A (see FIG. 4) in the captured image Im.

Configuration 1-1: As shown in FIG. 4, the first setting part 51 sets, in the captured image Im, a detection region D where the object A is detected. The responsive action part 90 (see FIG. 2) executes a predetermined responsive action in a case that the object A is in the detection region D in the captured image Im.

Configuration 1-2: The first setting part 51 (see FIG. 2) sets a boundary B that is a limit of the detection region D in the captured image Im. In the captured image Im, a side closer to the working machine 1 is defined as an image lower side Y2 (to-machine side); a side farther away from the working machine 1 is defined as an image upper side Y1 (fro-machine side); and a direction in which the object A approaches or moves away from the working machine 1 by the shortest distance is defined as a forward direction (in FIG. 4, corresponding to the image vertical direction Y). In the captured image Im, a direction orthogonal to the forward direction is defined as a front orthogonal direction (in FIG. 4, corresponding to an image left-right direction X). The boundary B extends in the image left-right direction X and has a certain shape.

In Configuration 1-1, a responsive action is executed in a case that the object A is in the detection region D set in the captured image Im. The surroundings observation device 20 (see FIG. 2) does not require a complicated process such as a calculation of a distance on a virtual plane from the working machine 1 to the object A after a conversion of a coordinate of the object A in the captured image Im to a coordinate on the virtual plane, Further, in Configuration 1-2, the boundary B extends in the image left-right direction X and has a certain shape, resulting in reducing the processing load caused by a determination as to whether or not the object A is in the detection region D (see Configuration 1-1 above) in comparison with a case that the shape of the boundary B is changeable. Thus, with Configurations 1-1 and 1-2, the processing load required for the detection of the object A can be reduced and the processing time can be shortened, thereby reducing a delay of the responsive action by the responsive action part 90 (see FIG. 2) in the case that the object A is in the detection region D.

Configuration 2: The boundary B is linear in the captured image Im.

Configuration 2 results in further reducing the processing load caused by the determination as to whether or not the object A is in the detection region D (see Configuration 1-1 above).

Configuration 3: The surroundings observation device 20 includes a second setting part 45 as shown in FIG. 2. As shown in FIG. 4, the second setting part 45 sets, in the captured image Im, a high distortion region Fb (first distortion region) and a low distortion region Fa (second distortion region) which is less distorted than the high distortion region Fb. The boundary B is set in the low distortion region Fa.

The following effects can be obtained from Configuration 3 above. In the case that a boundary B which extends in the image left-right direction X (i.e., is linear or substantially linear) is set in a region of the captured image Im where there is more distortion, the responsive action start distance varies greatly according to the position of the object A in the image left-right direction X of the captured image Im. In this case, the operator of the working machine 1 has difficulty in grasping the responsive action start distance (the sense of distance). In this regard, in Configuration 3, the boundary B is set in the low distortion region Fa, which allows the responsive action start distance to be uniform or substantially uniform regardless of the position of the object A in the image left-right direction X of the captured image Im, enabling the operator to easily grasp the responsive action start distance (i.e., the operator easily grasps the sense of distance), thereby encouraging the operator to perform an appropriate avoiding operation (operation of avoiding a contact of the working machine 1 with the object A).

Configuration 4: The surroundings observation device 20 includes a third setting part 53 as shown in FIG. 2. The third setting part 53 sets, in the captured image Im, a boundary upper limit position Ga (first utmost position) and a boundary lower limit position Gb (second utmost position) closer to the image lower side Y2 than the boundary upper limit position Ga as shown in FIG. 4. The boundary B is set within a region between the boundary upper limit position Ga and the boundary lower limit position Gb.

The following effects can be obtained from Configuration 4 above. A part of the image upper side Y1 and a part of the image lower side Y2 in the captured image Im are presumed to be an inappropriate position for the boundary B (e.g., because of having the sky or the lower traveling body 11). In this regard, in Configuration 4, the boundary B is set within a region between the boundary upper limit position Ga and the boundary lower limit position Gb, enabling an appropriate detection of the object A. For example, a misdetection of detecting an object other than the object A as the object A can be prevented.

Configuration 5: The surroundings observation device 20 (see FIG. 2) includes an adjusting part 52 (see FIG. 2) for adjusting the position of the boundary B in the image vertical direction Y.

The view angle and the attachment angle of the image capturing device 23 (see FIG. 1) are liable to vary within a range of tolerance. Thus, a fixed position of the boundary B in the image vertical direction Y causes the responsive action start distance to vary. In configuration 5 above, an adjustment of the position of the boundary B by the adjusting part 52 (see FIG. 2) serves as an adjustment of the responsive action start distance. Thus, the responsive action start distances can be adjusted to be a predetermined distance regardless of the variation in the view angle and the attachment angle of the image capturing devices 23 (i.e., the variation in the view angle and the attachment angle of the image capturing devices 23 can be offset).

There may be a case that the responsive action start distance is required to be changed according to the situation of the working place where the working machine 1 is. In Configuration 5, the responsive action start distance can be changed by adjusting the position of the boundary B with the adjusting part 52, resulting in improvement of usability.

The surroundings observation device 20 (see FIG. 2) that includes Configurations 4 and 5 above adjusts the position of the boundary B within a region between the boundary upper limit position Ga and the boundary lower limit position Gb. Thus, the boundary B is set so that the object A can be appropriately detected, thereby eliminating a wrong adjustment of, for example, adjusting the position of the boundary B to an inappropriate position (e.g., because of having the sky or the lower traveling body 11), resulting in an improvement in the adjustability of the position of the boundary B.

Configuration 6: The position of the boundary B in the captured image Im when a travel speed of the working machine 1 to the object A is a first speed is defined as a first position B1. The position of the boundary B in the captured image Im when the travel speed of the working machine 1 to the object A is a second speed higher than the first speed is defined as a second position B2. The adjusting part 52 sets the second position B2 to be closer to the image upper side Y1 than the first position B1.

The following effects can be obtained from Configuration 6 above. There may be a case that a higher travel speed of the working machine 1 toward the object A leads to a shorter time before the working machine 1 reaches the object A, resulting in a delay of the responsive action. Configuration 6 can make the object A enter the detection region D at a position farther away from the working machine 1 (i.e., make the responsive action start distance longer) in the case that the travel speed of the working machine 1 is the second (higher) speed, in comparison with the case of the first (lower) speed. Thus, the responsive action can be started earlier in the case of the second (higher) speed than in the case of the first (lower) speed.

Configuration 7: The surroundings observation device 20 includes a delimiting part 43 as shown in FIG. 2. The delimiting part 43 sets a specific upper limit position Ea (first limit position) in the captured image Im as shown in FIG. 4. The specifying area in which the specifying part 41 specifies the object A is within a region closer to the image lower side Y2 than the specific upper limit position Ea.

The following effects can be obtained from Configuration 7 above. A part of the image upper side Y1 in the captured image Im is presumed to be an inappropriate position (e.g., because of having the sky) for specifying the object A. In this regard, in Configuration 7, the specifying area in which the specifying part 41 specifies the object A is within a region closer to the image lower side Y2 than the specific upper limit position Fa. Thus, the object A can be specified appropriately. Further, the specifying area of the specifying part 41 (see FIG. 2) can be limited in comparison with the case that the specifying part 41 specifies the object A in the whole of the captured image Im, thereby reducing the processing load on the specifying part 41 (see FIG. 2) and shortening the processing time.

Configuration 8: The surroundings observation device 20 includes a delimiting part 43 as shown in FIG. 2. The delimiting part 43 sets a specific lower limit position Eb (second limit position) in the captured image Im as shown in FIG. 4. The specifying area in which the specifying part 41 specifies the object A is within a region closer to the image upper side Y1 than the specific lower limit position Eb.

The following effects can be obtained from Configuration 8 above. A part of the image lower side Y2 in the captured image Im is presumed to be an inappropriate position (e.g., because of having only the upper slewing body 13 (see FIG. 1)) for specifying the object A. In this regard, in Configuration 8, the specifying area in which the specifying part 41 specifies the object A is within a region closer to the image upper side Y1 than the specific lower limit position Eb. Thus, the object A can be specified appropriately. Further, in comparison with the case that the specifying part 41 (see FIG. 2) specifies the object A in the whole of the captured image Im, the specifying area can be limited, thereby reducing the processing load on the specifying part 41 (see FIG. 2) and shortening the processing time.

Configuration 9: The surroundings observation device 20 includes a second setting part 45 as shown in FIG. 2. As shown in FIG. 4, the second setting part 45 sets respective high distortion regions Fb (fourth distortion region and third distortion region) in the image upper side Y1 and the image lower side Y2. The second setting part 45 sets a low distortion region Fa (second distortion region) having less image distortion than the high distortion region Fb. The specifying area in which the specifying part 41 specifies the object A is within the low distortion region Fa and the high distortion region Fb in the image lower side Y2.

The following effects can be obtained from Configuration 9 above. In the captured image Im, the region where there is more distortion, which is a part of the image upper side Y1, is presumed to be an inappropriate position (e.g., because of having the sky) for specifying the object A. In this regard, in Configuration 9, the specifying area in which the specifying part 41 specifies the object A is within the low distortion region Fa and the high distortion region Fb in the image lower side Y2. Thus, the object A can be specified appropriately. Further, the specifying area of the specifying part 41 (see FIG. 2) can be limited in comparison with the case that the specifying part 41 specifies the object A in the whole of the captured image Im, thereby reducing the processing load on the specifying part 41 (see FIG. 2) and shortening the processing time.

Configuration 10: As shown in FIG. 5, the first setting part 51 (see FIG. 2) further sets a standard line B that is the limit between a detection region D1 and a detection region D2 in a portion closer to the working machine 1 than the boundary B that is the limit between the detection region D and the non-detection region C. The responsive action part 90 (see FIG. 2) changes the responsive action according to whether the position of the object A is closer to or farther away from the working machine 1 than the standard line B.

Configuration 10 above allows a change of the responsive action (e.g., a warning, an operational restriction) according to the distance from the working machine 1 to the object A, enabling an appropriate notification to the operator of, for example, the position of the object A.

Configuration 11: A plurality of image capturing devices 23 (see FIG. 1) are provided. The first setting part 51 (see FIG. 2) sets a boundary B on each captured image Im taken by the plurality of image capturing devices 23 (see FIG. 1).

Configuration 11 above allows setting the responsive action start distance for each image capturing device 23, thereby providing an improved usability. Specifically, each view angle, attachment angle, and attachment position of the plurality of image capturing devices 23 shown in FIG. 1 vary. Thus, if a boundary B is set at a common position for the captured image Im of each image capturing device 23, the responsive action start distance for each image capturing device 23 varies. In this regard, in Configuration 11, a boundary B is set for each image capturing device 23, allowing each responsive action start distance of the plurality of image capturing devices 23 to be uniform or substantially uniform.

Modifications

The embodiment described above may include various modifications. For example, the connections between the respective constituents in the embodiment shown in FIG. 2 may be changed. Each region (e.g., low distortion region Fa) shown in FIG. 4 and each position (e.g., specific upper limit position Ea) for defining a region may be fixed, but these regions or positions may be changed manually, or changed automatically according to a condition. The number of components may be changed, or alternatively some components may be omitted. Constituents described as members or parts different from each other may be combined into one member or one part. A constituent described as a member or a part may be separately provided as members or parts different from each other.

The invention claimed is:

1. A surroundings observation device for use in a working machine, comprising:
    at least one image capturing device which is provided on the working machine to capture an image of an object around the working machine and thereby obtain an captured image;
    a specifying part for specifying a position of the object in the captured image;
    a first setting part for setting in the captured image a detection region where the object is to be detected; and
    a responsive action part for executing a predetermined responsive action in a case that the object is in the detection region in the captured image,
    wherein
        the first setting part sets a boundary that is a limit of the detection region in the captured image,
        the boundary extends in a front orthogonal direction and has a certain shape, and
        the front orthogonal direction being orthogonal to a forward direction of the working machine in the captured image.

2. The surroundings observation device for use in the working machine according to claim 1, wherein the boundary is linear in the captured image.

3. The surroundings observation device for use in the working machine according to claim 1, further comprising:
    a second setting part for setting, in the captured image, a first distortion region and a second distortion region which is less distorted than the first distortion region, wherein the boundary is set in the second distortion region.

4. The surroundings observation device for use in the working machine according to claim 1, further comprising:
    a third setting part for setting, in the captured image, a first utmost position that allows setting the boundary farthest away from the working machine and a second utmost position that allows setting the boundary closest to the working machine, wherein the boundary is set between the first utmost position and the second utmost position.

5. The surroundings observation device for use in the working machine according to claim 1, further comprising:
    an adjusting part for adjusting a position of the boundary in the forward direction.

6. The surroundings observation device for use in the working machine according to claim 5, wherein the adjusting part adjusts the position of the boundary to a first position in the captured image when a travel speed of the working machine toward the object is a first speed, and adjusts the position of the boundary to a second position farther away from the working machine than the first position in the captured image when the travel speed of the working machine toward the object is a second speed higher than the first speed.

7. The surroundings observation device for use in the working machine according to claim 1, further comprising:
    a delimiting part for setting a first limit position in the captured image, wherein a specifying area in which the specifying part specifies the object is within a region closer to the working machine than the first limit position.

8. The surroundings observation device for use in the working machine according to claim 1, further comprising:
    a delimiting part for setting a second limit position in the captured image, wherein a specifying area in which the specifying part specifies the object is within a region farther away from the working machine than the second limit position.

9. The surroundings observation device for use in the working machine according to claim 3, wherein the first distortion region includes a third distortion region and a fourth distortion region, the third distortion region being closer to the working machine than the second distortion region and the fourth distortion region being farther away from the working machine than the second distortion region, and a specifying area in which the specifying part specifies the object is within the second distortion region and the third distortion region.

10. The surroundings observation device for use in the working machine according to claim 1, wherein the first setting part further sets a standard line in a portion closer to the working machine than the boundary, and the responsive action part changes the responsive action according to whether the position of the object is closer to or farther away from the working machine than the standard line.

11. The surroundings observation device for use in the working machine according to claim 1, wherein the at least one image capturing device includes a plurality of image capturing devices, and the first setting part sets the boundary in each of a plurality of captured images captured by the plurality of image capturing devices.

* * * * *